May 1, 1928.
C. PANDOLFO
1,668,463
TROLLEY HEAD
Filed March 28, 1927
2 Sheets-Sheet 1
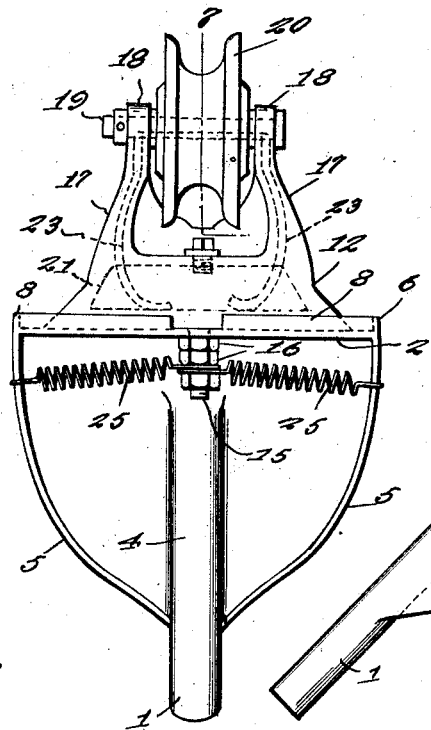
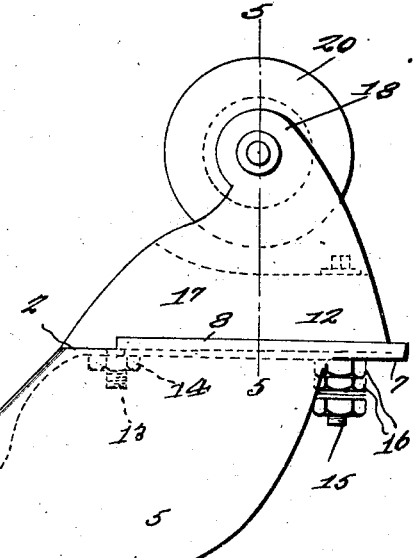
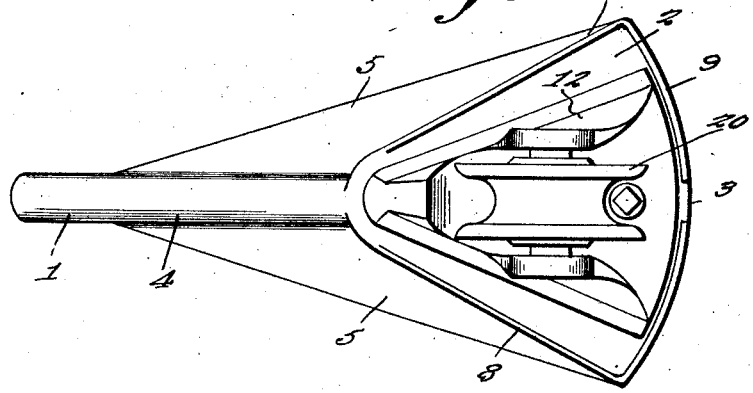
Carmelo Pandolfo INVENTOR
BY *Victor J. Evans*
ATTORNEY
WITNESS:

May 1, 1928.

C. PANDOLFO 1,668,463

TROLLEY HEAD

Filed March 28, 1927

Carmelo Pandolfo
INVENTOR

BY Victor J. Evans
ATTORNEY

WITNESS:

Patented May 1, 1928.

1,668,463

UNITED STATES PATENT OFFICE.

CARMELO PANDOLFO, OF MONTEVIDEO, URUGUAY.

TROLLEY HEAD.

Application filed March 28, 1927. Serial No. 179,044.

This invention relates to trolleys, and its general object is to provide a trolley pole head which includes a wheel carrying harp mounted for movement so as to accommodate itself to trolley wires for travel thereon regardless of the position of the latter.

A further object of the invention is to provide a trolley pole head having a wheel carrying harp mounted for movement in an arcuate horizontal plane, so as to follow a trolley wire about a curve or the like or during the lateral swinging movement of said wire, without fear of displacement of the trolley wheel from the wire, with the result the annoyance of the wheel jumping the wire will be overcome, therefore the schedule of cars equipped with the novel head will be maintained, and damage to the trolley pole, trolley wires and other overhead apparatus will be eliminated.

Another object of the invention is to provide a trolley wheel carrying harp that will not interfere with any overhead construction of the trolley.

A further object of the invention is to provide a trolley head of the character set forth, that is simple in construction, inexpensive to manufacture, strong and durable and that will perform its intended function with very little attention.

A still further object is to provide a novel lubricating means for the trolley wheel.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a rear elevation of the trolley pole head which forms the subject matter of the present invention.

Figure 2 is a side elevation thereof.

Figure 3 is a top plan view.

Figure 4:
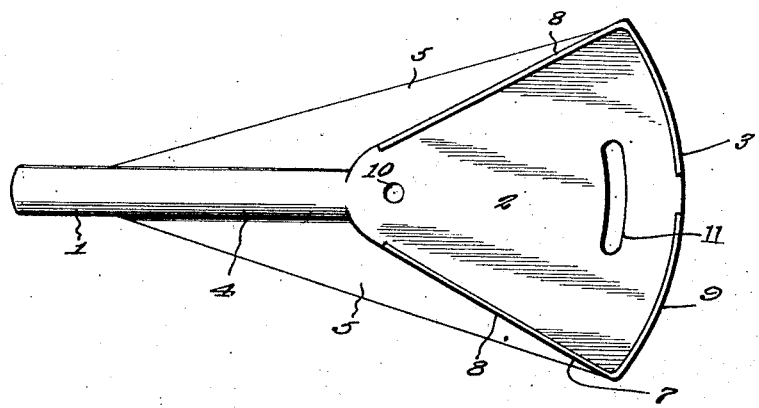

Figure 4 is a top plan view of the pole carrying portion of the head.

Figures 5, 7:
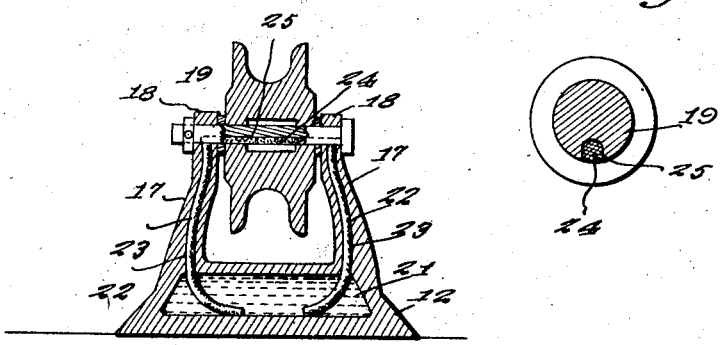

Figure 5 is a sectional view taken on line 5—5 of Figure 2.

Figure 6:
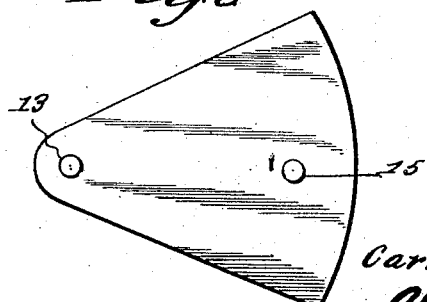

Figure 6 is a bottom plan view of the wheel carrying harp.

Figure 7 is a sectional view taken on line 7—7 of Figure 1.

Referring to the drawings in detail the reference numeral 1 indicates a bar adapted to have its lower end fixed to the upper end of a trolley pole (not shown), and formed integral with the reduced upper end of said bar 1 is a substantially triangular shaped plate 2 having an arcuate rear edge 3 as shown. Secured to said bar and having its central portion curved thereabout in sleeve formation as at 4 is a hood which includes spaced parallel rearwardly extending wings 5 merging into the sleeve portion 4 thereof at their forward portions and having their upper edges terminating above the side edges of the plate as at 6 with rearwardly extending strips 7 formed therewith and following the curvature of the rear edge of the plate 2 as best shown in Figure 4 of the drawings. The upwardly extending edges of the wings as well as the strips 7 provide flanges 8 and 9.

The plate 2 is provided with an opening 10 arranged adjacent its apex and a slot 11 is also formed in said plate 2 adjacent its rear edge thereof, and said slot is of arcuate formation as best shown in Figure 4 of the drawings. Mounted on said plate 2 is the harp of the trolley head, and said harp includes a base 12 formed with a bottom of substantially the same shape as the plate 2. Depending from adjacent the apex of the bottom of the harp is a bolt 13 which passes through the opening 10 and is loosely secured therein through the instrumentality of a nut 14 so that the harp will be capable of slidable movement on the plate as will be readily apparent. To limit this slidable movement I have provided a bolt 15 which passes through the base adjacent the rear ends thereof and is loosely secured in the slot 11 by lock nuts 16 as best shown in Figures 1 and 2 of the drawings. The side walls 17 of the harp converge upwardly and terminate in spaced parallel apertured ears 18 within which is secured the shaft 19 for the trolley wheel 20.

The base 12 is provided with a lubricant reservoir 21 which has arranged in communication therewith bores 22 arranged in the sides 17 as best shown in Figure 5 and disposed in these bores are wicks 23 which have their lower ends in contact with lubricant in the reservoir and their upper ends terminate in the apertures of the ears 18 in a manner to be arranged in contact with a wick 24 disposed within a longitudinal groove 25 formed in the shaft 19. By this construction, it will be apparent that the trolley wheel will be adequately lubricated at all times as the wicks 23 will draw the lubricant from the reservoir by capillary action and these wicks 23 will in turn convey the lubricant to the wick 24 whereby it will be distributed about the shaft by the rotation of the trolley wheel on its wire.

In order to retain the harp in a normal centered position as best shown in Figures 1 and 3 of the drawing I have provided a resilient means which includes coil springs 25 having one of their ends secured to the bolt 16 and held thereon by a nut as shown, and the opposite ends of said coil springs are secured to the wings 5.

From the above description and disclosure of the drawings it will be obvious that I have provided a trolley pole head having a harp mounted for slidable movement whereby the trolley wheel will follow its wire at all times regardless of the position of said wire, with the result, that the jumping of the wheel from the wire will be eliminated, regardless of curved and irregular sections of trolley wire, high speed and obstructions such as frogs, guard rails, hangers and other overhead construction.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A trolley head of the character described comprising a bar adapted to be secured to a trolley pole, a substantially triangular shaped plate having an arcuate rear edge and formed with an opening adjacent its apex and a slot adjacent to and following the curvature of the rear edge, supporting wings having connection with the bar and plate respectively, a harp including a base having a lubricant reservoir therein, means passing through said base and mounted in said opening for pivotally securing the harp to said plate, means for limiting the pivotal movement of said harp and passing through said slot, converging side walls included in said harp and rising in spaced parallel relation from said base, said side walls being provided with a bore, a trolley wheel journaled between said ears, and wicks in said bores and having their lower ends arranged in said reservoir in a manner to provide lubricant to the trolley wheel.

In testimony whereof I affix my signature.

CARMELO PANDOLFO.